United States Patent [19]

Buchin

[11] Patent Number: 5,299,272
[45] Date of Patent: Mar. 29, 1994

[54] METHOD FOR ATTACHING A GRADIENT INDEX LENS TO AN OPTICAL FIBRE IN THE COURSE OF MAKING AN OPTICAL INSTRUMENT

[75] Inventor: Michael P. Buchin, Palo Alto, Calif.

[73] Assignee: Origin Medststems, Inc., Menlo Park, Calif.

[21] Appl. No.: 9,462

[22] Filed: Jan. 27, 1993

[51] Int. Cl.$^5$ .............................................. G02B 6/32
[52] U.S. Cl. ....................................... 385/34; 385/33; 385/51; 385/119
[58] Field of Search ...................... 385/31, 33, 34, 35, 385/51, 52, 116, 117, 119

[56] References Cited

U.S. PATENT DOCUMENTS

| | | | |
|---|---|---|---|
| 4,067,937 | 1/1978 | Unno et al. | 385/33 |
| 4,137,060 | 1/1979 | Timmermann | 385/33 |
| 4,265,511 | 5/1981 | Nicia et al. | 385/33 |
| 4,290,667 | 9/1981 | Chown | 385/33 |
| 4,360,249 | 11/1982 | Slemon | 385/33 |
| 4,398,791 | 8/1983 | Dorsey | 385/33 |
| 4,600,267 | 7/1986 | Yamasaki et al. | 385/33 |
| 4,626,069 | 12/1986 | Dammann et al. | 385/33 |
| 4,649,271 | 3/1987 | Hok et al. | 385/33 |
| 4,750,795 | 6/1988 | Blotekjaer | 385/33 |
| 5,018,820 | 5/1991 | Boudreau et al. | 385/33 |

OTHER PUBLICATIONS

SELFOC® Product Guide, NSG America, Inc., Somerset, N.J.

Primary Examiner—Frank Gonzalez
Attorney, Agent, or Firm—Limbach & Limbach

[57] ABSTRACT

A method of attaching a Gradient Index (GRIN) lens to an optical fibre in the course of making an optical instrument for use at a working distance. The method is especially suitable for making an optical instrument with an extended working distance. In the method, a test object, a GRIN lens, and an optical fibre are provided. The GRIN lens is placed at the working distance from the test object, and is axially aligned with the test object. The optical fibre is placed adjacent to, and axially aligned with, the GRIN lens to form an image of the test object at the proximal face of the optical fibre. The distal face of the optical fibre is placed adjacent to the proximal face of the GRIN lens. At least one of the GRIN lens and the optical fibre is moved axially with respect to the other until the image of the test object is in focus. This determines an optimum axial spacing between the GRIN lens and the optical fibre. Finally, the GRIN lens is attached to the optical fibre with the optimum axial spacing between the GRIN lens and the optical fibre.

54 Claims, 4 Drawing Sheets

METHOD FOR ATTACHING A GRADIENT INDEX LENS TO AN OPTICAL FIBRE IN THE COURSE OF MAKING AN OPTICAL INSTRUMENT

BACKGROUND OF THE INVENTION

Known methods for producing low profile, small diameter fiber-optic endoscopes involve attaching a Gradient Index (GRIN) lens to the distal end of a fiber-optic image bundle. A GRIN lens is especially suitable for such applications since it is substantially cylindrical, and, when attached to the distal end of the fibre-optic bundle, forms a linear extension of the fibre-optic bundle.

A GRIN lens is cylindrical and has a refractive index that varies according to the distance from the axis, as shown in FIG. 1. The lens has two opposing, substantially plane, faces perpendicular to the axis. As well as refracting light at these surfaces, a GRIN lens refracts light as a result of the radial gradient in the refractive index of the lens material. In contrast to a GRIN lens, a more-common convex or concave lens has a constant refractive index and one or more curved surfaces at which light is refracted.

When attached to a fibre-optic bundle, a GRIN lens forms a real image of an object placed in front of the lens on the distal face of the fibre-optic bundle to which the GRIN lens is attached. The fibre-optic bundle transmits this image to the proximal end of the fibre-optic bundle where the image can be viewed directly, using a suitable eye piece, or additional lenses can be used to focus the image on the pickup of a video camera.

Optical instruments comprising a GRIN lens and a fibre-optic bundle provide a focussed image of an object placed at a specified distance, or placed within a range of a specified distance, from the distal face of the lens. This specified distance is called the working distance of the instrument. Typically, most GRIN lenses for small-diameter imaging applications, i.e., for use with an imaging bundle in the range of 0.25 to 1 mm in diameter, are designed for making instruments with a working distance of between five and fifteen millimeters (0.2 to 0.6 inches). One millimeter GRIN lenses for use in instruments with a working distances of 25-50 mm (1"-2") are also available to special order.

In small diameter endoscopes used in laparoscopic surgery, and in optically-equivalent instruments used in other applications, it is often desirable to have working distances considerably greater than 50 mm (2 inches). Instruments operating at such hyper-extended working distances cannot be mass-produced simply by attaching a nominal ¼-pitch GRIN lens to the end of a fibre-optic bundle. Tolerances in the refractive index, in the radial profile of the refractive index, and in the length of the lens mean that the pitch of the lens has a tolerance that causes large variations in the sharpness of the image. Consequently, mass-producing instruments in this way would provide an unacceptably small yield of instruments having a satisfactorily sharp image.

To produce instruments for hyper-extended working distances with a satisfactorily sharp image, a GRIN lens having a nominal pitch of greater than ¼ is attached to the distal end of a fibre-optic bundle, and the lens is then individually polished to length until the desired image sharpness is reached. Working distances beyond several inches (several hundred millimeters) can be achieved by this method, in which the polishing process essentially produces a GRIN lens of exactly ¼ pitch (infinity focus). Because the need to polish the lens each lens/fiber-optic assembly individually, the known assembly process is time consuming and expensive. Also, because polishing is carried out after the lens has been attached to the fibre-optic bundle, the whole lens/fibre optic assembly must be rejected if the polishing process damages the lens.

The polishing process in the presently-known assembly method can damage the GRIN lens of the lens/-fibre-optic assembly. More significantly, the polishing process can polish the lens beyond the point at which the image is optimally focussed. This destroys the ability of the lens to form an image on the distal face of the fibre-optic bundle of an object at any distance. Thus, because it includes polishing the lens to achieve an optimally-focussed image, the presently-known assembly method involves the risk that the lens polishing process will over-polish the lens, resulting in a useless lens/fibre-optic assembly. Because of this risk, manufacturers tend to stop polishing the lens at a point just before that which gives an optimally-focussed image. This improves yields, but produces lens/fibre-optic assemblies in which the image is not quite optimally focussed. Moreover, the process is time consuming and labour intensive.

OBJECTS AND SUMMARY OF THE INVENTION

It is an object of the present invention to provide a method for attaching a GRIN lens to a fibre-optic bundle in the course of making an optical instrument primarily for use at extended working distances in which there is no need to polish the lens after the lens has been attached to the fibre-optic bundle.

It is an object of the present invention to provide a method for attaching a GRIN lens to a fibre-optic bundle in the course of making an optical instrument primarily for use at extended working distances in which an optimally-focussed image is produced, irrespective of variations in the nominal pitch of the lens.

It is an object of the present invention to provide a method for attaching a GRIN lens to a fibre-optic bundle in the course of making an optical instrument primarily for use at extended working distances in which at least parts of the assembly method can be easily automated.

It is an object of the present invention to provide a method for attaching a GRIN lens to a fibre-optic bundle in the course of making an optical instrument primarily for use at extended working distances in which the method can be easily adapted for making instruments optimized for different working distances.

Accordingly, the present invention provides a method of attaching a GRIN lens to an optical fibre in the course of making an optical instrument. In the method, a test object, a GRIN lens and an optical fibre are provided. The GRIN lens is placed at the working distance from the test object, and axially aligned therewith. The optical fibre is placed adjacent to, and axially aligned with, the GRIN lens to form an image of the test object at the proximal face of the optical fibre. The distal face of the optical fibre is placed adjacent to the proximal face of the GRIN lens. At least one of the GRIN lens and the optical fibre is moved axially with respect to the other until the image of the test object is in focus. This determines an optimum axial spacing between the GRIN lens and the optical fibre. Finally, the GRIN lens is attached to the optical fibre with the optimum axial spacing between the GRIN lens and the optical fibre.

In the preferred method according to the invention for attaching a GRIN lens to an optical fibre in the course of making an optical instrument for use at a working distance, a test object, a GRIN lens, an optical fibre, and a curable liquid adhesive are provided. The GRIN lens is placed at the working distance from test object, and axially aligned with it. The optical fibre is placed adjacent to, and axially aligned with, the GRIN lens to form an image of the test object at the proximal face of the optical fibre. The distal face of the optical fibre is placed adjacent to the proximal face of the GRIN lens. The curable liquid adhesive is introduced between the proximal face of the GRIN lens and the distal face of the optical fibre. At least one of the GRIN lens and the optical fibre is moved axially with respect to the other until the image of the test object is in focus. Finally, the curable liquid adhesive is cured.

The invention also provides an optical instrument for use at a working distance. The optical instrument includes a GRIN lens and an optical fibre, and is made by a method in which a test object, a GRIN lens, and an optical fibre are provided. The GRIN lens is placed at the working distance from the test object, and is axially aligned with it. The optical fibre is placed adjacent to, and axially aligned with, the GRIN lens to form an image of the test object at the proximal face of the optical fibre. The distal face of the optical fibre is placed adjacent to the proximal face of the GRIN lens. At least one of the GRIN lens and the optical fibre is moved axially with respect to the other until the image of the test object is in focus. This determines an optimum axial spacing between the GRIN lens and the optical fibre. Finally, the GRIN lens is attached to the optical fibre with the optimum axial spacing between the GRIN lens and the optical fibre.

DETAILED DESCRIPTION OF THE INVENTION

Figure 1:
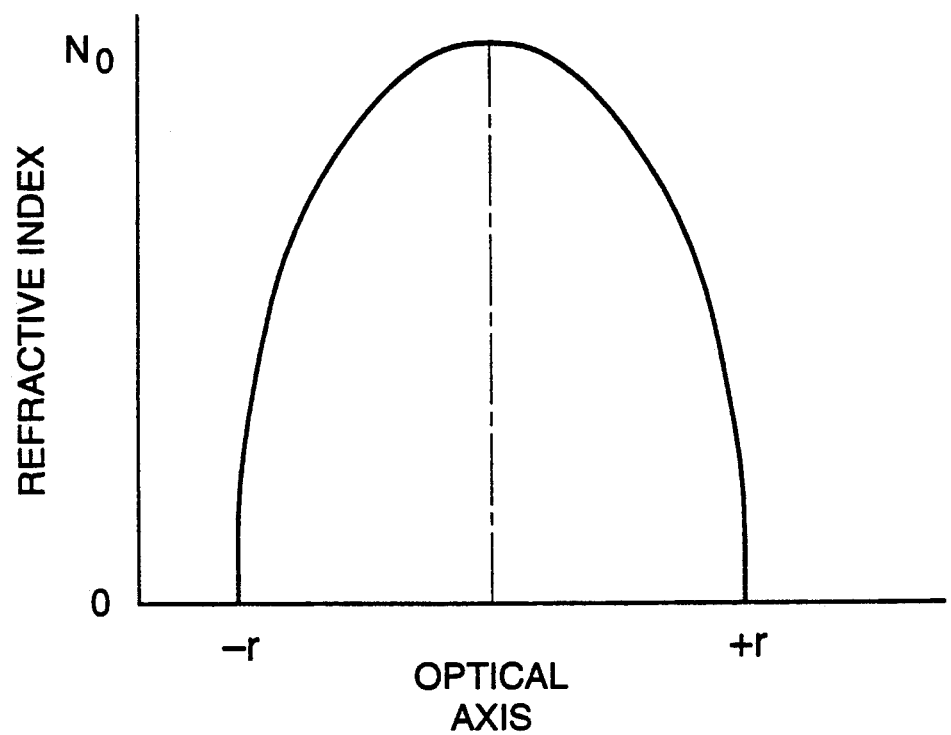
FIG. 1 is a graph showing the radial variation of the refractive index of a GRIN lens.

The invention relates to a method for attaching a GRIN lens to a fibre-optic bundle in the course of making an optical instrument having a working distance individually set to any desired value. The method is particularly useful for making in the course of making an optical instrument having an extended working distance, i.e., a working distance greater than about fifty times the diameter of the lens. This corresponds to a working distance of more than about 25 mm (1") for a 0.5 mm (0.020") diameter lens. In practice, a working distance of greater than about 150 times the diameter of the lens (i.e., 75 mm (3") for a 0.5 mm diameter lens) can be regarded as a working distance of infinity. This method is primarily intended for use in assembling low-profile fibre-optic endoscopes for use at extended working distances. The method may also be used for assembling low-profile fibre-optic endoscopes for use at non-extended working distances, and for assembling other types of optical instruments with a similar structure.

In known methods of attaching a GRIN lens to a fibre-optic bundle in the course of assembling an optical instrument having an extended working distance, the proximal face of GRIN lens is attached to the distal end of the fibre-optic bundle. The distal face of the GRIN lens is then polished to the length that provides an optimally-focussed image of an object at the required working distance. The known methods may trade an optimally-focussed image for a greater yield of useable units, as described above.

In the method according to the invention, a test object is placed on the optical axis. A GRIN lens is mounted on the optical axis at the required working distance from the test object. The fibre-optic bundle is mounted on the optical axis with its distal face spaced a short distance from the proximal face of the GRIN lens. The space between the two faces is filled with a curable liquid adhesive. The image at the proximal end of the fibre-optic bundle of the object is observed using a suitable optical instrument, such as an eyepiece, a microscope, or a video camera. The relative position on the optical axis of the lens and/or the fibre-optic bundle is adjusted until the image is optimally focussed. The curable adhesive is then cured to attach the lens to the fibre-optic bundle.

During the adjustment process, the quality of the image at the proximal end of the fibre-optic bundle is observed using a suitable optical instrument, or is electronically monitored, so that remedial action can be taken if the quality of the image falls below a predetermined level.

Alternatively, the relative position on the optical axis of the lens and/or the fibre-optic bundle may be adjusted before the space between the two faces is filled with the curable liquid adhesive. When the image is optimally focussed, the space between the two faces is filled with a curable liquid adhesive. The relative position on the optical axis of the lens and/or the fibre-optic bundle is then re-adjusted until the image is again optimally focussed. The curable adhesive is then cured to attach the lens to the fibre-optic bundle.

This alternative method enables the quality of the focussed image to be observed or electronically monitored without the adhesive present. If the quality of the focussed image is below standard, the juxtaposed faces of the GRIN lens and the fibre optic bundle can be cleaned and/or re-polished and/or other defects remedied to improve the image quality before proceeding with the assembly process.

Figure 2A:
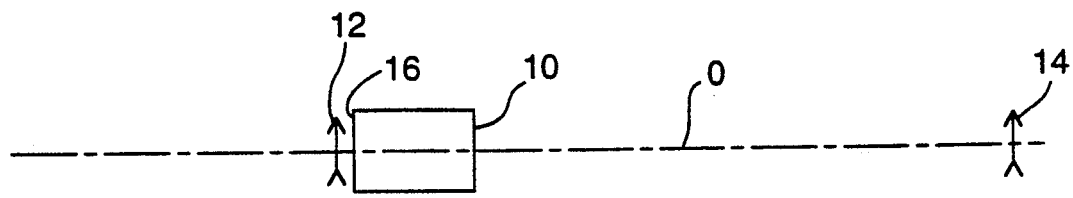
FIG. 2A shows the location of the image produced by a less-than-¼-pitch GRIN lens of a distant object.

In the method according to the invention, the GRIN lens has a nominal pitch of less than $\frac{1}{4}$ pitch when the optical instrument is for use at an extended working distance. A GRIN lens having a nominal pitch of less than $\frac{1}{4}$, which will, from now on, be called a "less-than-$\frac{1}{4}$-pitch GRIN lens," forms an image of a distant object not on the proximal surface of the lens but at a point proximal of the proximal face, as shown in FIG. 2A. In FIG. 2A, the GRIN lens 10 forms the image 12 of the "distant" object 14. The image 12 is located proximally of the proximal face 16 of the lens.

A GRIN lens with a nominal pitch in the range of 0.20–0.24 would normally be used in an instrument for use at an extended working distance. The nominal pitch required depends on the working distance and the tolerance in the nominal pitch specified by the lens manufacturer. The greater the specified pitch tolerance, the smaller must the nominal pitch be to ensure that a lens at the maximum of the pitch tolerance range has a pitch of less than 0.25. A lens with a pitch of greater than 0.25 cannot be used in an instrument for use at an extended working distance because such a lens would form the image of a distant object at a point inside the lens, instead of at a point proximal to the proximal face of the lens. On the other hand, a lens with pitch significantly less than 0.25 is undesirable since the gap between the juxtaposed faces of the lens and the fibre-optic bundle becomes unacceptably large with such a lens. As an alternative to a GRIN lens having a nominal pitch of 0.25, a GRIN lens having a nominal pitch of just less than an odd multiple of 0.25 could be used.

Figure 2B:
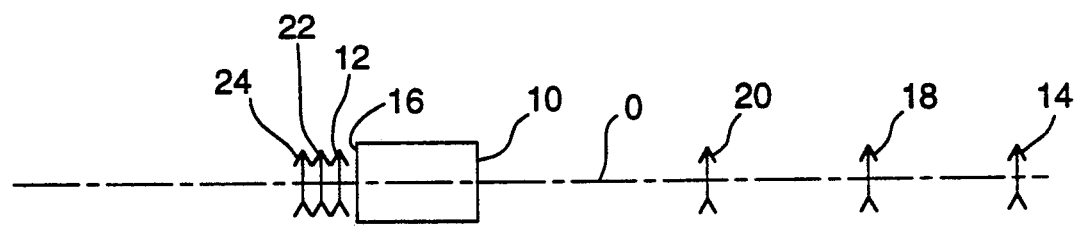
FIG. 2B shows the location of the images produced by a less-than-¼-pitch GRIN lens of objects at different distances from the lens.

A less-than-$\frac{1}{4}$-pitch GRIN lens forms the image of a less-distant object further from the proximal surface of the lens than the image of a more-distant object, as shown in FIG. 2B. FIG. 2B shows an arrangement similar to that shown in FIG. 2A. The image 12 of the distant object 14 is formed closest to the proximal face 16 of the lens 10. As the working distance is reduced, as exemplified by the object being moved to the positions 18 and 20, progressively closer to the lens, the resulting images 22 and 24, respectively, are formed progressively further from the proximal face 16. Consequently, the GRIN lens in an instrument for use at a non-extended working distance can have a nominal pitch of greater than 0.25 to reduce the spacing between the image (e.g., the image 24) and the proximal face 16. This avoids an unacceptably wide gap between the proximal face of the GRIN lens and the distal face of the fibre-optic bundle in a non-extended working distance instrument.

Figure 3A:
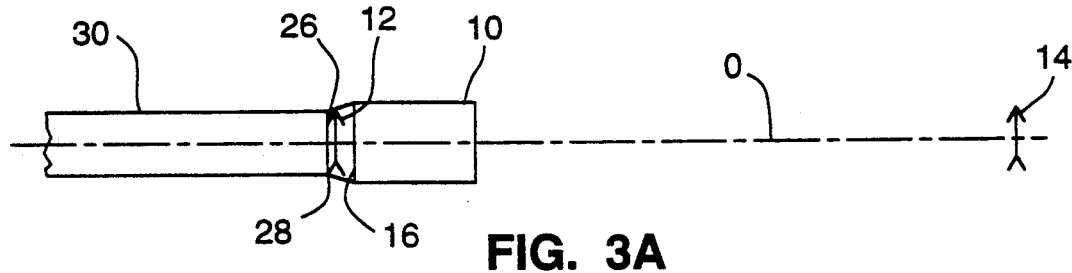
FIG. 3A illustrates the method according to the invention with the GRIN lens and the fibre-optic bundle arranged before adjustment of their relative axial position.
Figure 3B:
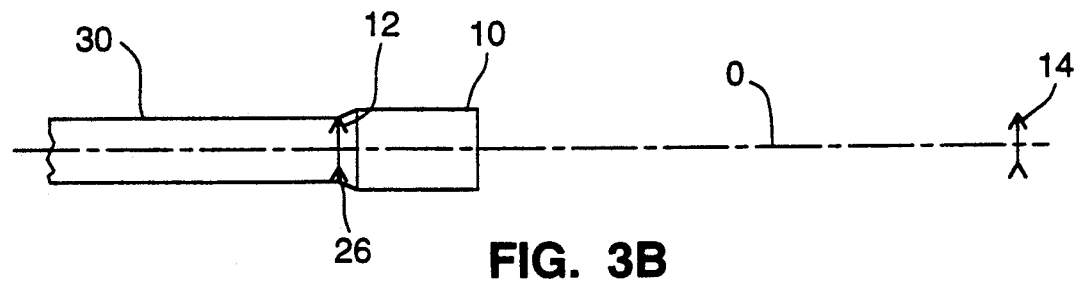
FIG. 3B illustrates the method according to the invention with the GRIN lens and the fibre-optic bundle arranged after adjustment of their relative axial position.

The method of attaching the less-than-$\frac{1}{4}$-pitch GRIN lens 10 to the fibre-optic imaging bundle 30 in the course of making an optical instrument for an extended working distance is illustrated in FIGS. 3A and 3B. The method can also be used for making an optical instrument optimized for a non-extended working distance. In the method, the relative axial position of the lens 10 and the fibre-optic bundle 30 is initially such that the image 12 of the test object 14 at the desired working distance is formed at a point proximal of the proximal face 16 of the lens. The image 12 is thus formed in the space between the proximal face 16 of the lens and the distal face 26 of the fibre-optic bundle. This space is normally filled with the curable liquid adhesive 28.

The relative axial position of the lens 10 and fibre-optic bundle 30 is then adjusted so that the image 12 of the test object 14 is formed exactly on the distal face 26 of the fibre-optic bundle 30. When the image 12 is formed exactly on the distal face 26, the image at the proximal end of the fibre-optic bundle 30 is optimally focussed. The relative axial position of the lens 10 and the fibre-optic bundle 30 is adjusted by observing the image at the proximal end of the fibre-optic bundle by means of a suitable optical instrument, such as an eyepiece, a microscope, or a video camera, and adjusting the relative axial position until the image is optimally focussed.

During the process of adjusting the relative axial position of the lens 10 and the fibre-optic bundle 30, surface tension holds the adhesive 28 in place between the lens and the fibre-optic bundle. The fluidity of the adhesive 28 allows the positional adjustment to be made. Unlike polishing the distal face of the lens, if adjusting the relative axial position of the lens and fibre-optic bundle goes beyond the optimum focus point and results in an inability to form a focussed image of an object at any distance, the focussed image can be restored simply by backing off the adjustment.

Once the positioning adjustment just described has been made, the lens 10 and the fibre-optic bundle 30 are held in position and the adhesive 28 is cured to attach the lens to the fibre-optic bundle. A secondary sleeve or sheath (not shown) may the be put over the lens/fibre-optic bundle assembly to add strength and ruggedness.

During the adjustment process just described, the quality of the image is observed using a suitable optical instrument, or is electronically monitored, to determine whether the image quality meets a required quality standard. If the image quality falls below the required standard, appropriate remedial steps may be taken before the adhesive is cured.

The positioning adjustment may also be made initially without the adhesive in place. In this case, a primary positioning adjustment is made without the adhesive. This allows the quality of the image to be observed without the adhesive present. If the quality of the focussed image is unsatisfactory because of dirt between the juxtaposed faces of the lens 10 and the fibre-optic bundle 30, or because of a flaw in one of the components, it is easier to take remedial action without the adhesive present. Once the quality of the focussed image is satisfactory, the adhesive 28 is then introduced between the proximal face 16 of the lens 10 and the distal face 26 of the fibre-optic bundle 30. A secondary adjustment is then required because adhesive has a refractive index different from that of air. After the secondary adjustment has been made, the lens and the fibre-optic bundle are held in position, and the adhesive is cured.

The adhesive 28 is a liquid, curable, optically clear adhesive that has a refractive index that is substantially unchanged by curing the adhesive. For example, a two-part optical epoxy that cures at room temperature or at a temperature above room temperature, a solvent-based adhesive, or a visible light cured adhesive meeting the requirements set forth above may be used. In the preferred embodiment, an adhesive that is cured by irradiation with ultraviolet light is used, such as Type 81, made by Norland Products, Inc.

Figure 4:
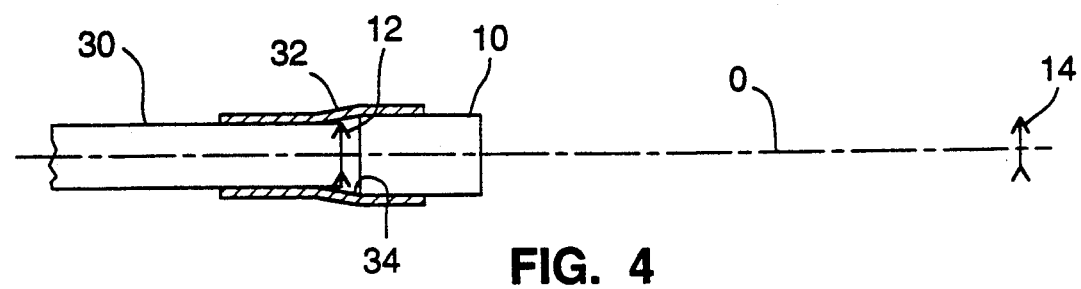
FIG. 4 shows an alternative way of attaching the GRIN lens to the fibre-optic bundle that allows the relative axial position of the lens and the fibre-optic bundle to be adjusted and then fixed.

Although a layer of a curable liquid adhesive is the preferred way of attaching the lens to the fibre-optic bundle, alternative ways of attaching the GRIN lens 10 to the fibre-optic bundle 30 may be used. For example, as shown in FIG. 4, the sleeve 32 may be attached close to the distal end of the fibre-optic bundle 30. The sleeve 32 has a bore 34 in which the lens 10 is a precision sliding fit. The lens 10 is slid axially in the bore 34 to adjust the relative position of the lens 10 and the fibre optic bundle 30. As described above, the positioning adjustment is made such that the image of the object 14 at the proximal end of the fibre optic bundle is optimally focussed. The lens 10 is then fixed in place in the sleeve 32, which fixes the axial position of the lens 10 relative to the fibre optic bundle 30.

The GRIN lens 10 may be fixed in place in the sleeve 32 by a suitable adhesive or by crimping. This alternative way of attaching the lens 10 to the fibre-optic bundle 30 provides a positive radial location of the lens relative to the fibre-optic bundle 30 during adjustment of the relative axial position of the lens and the fibre-optic bundle. This arrangement also allows a wider range of adhesives to be used (e.g., opaque adhesives) because the adhesive does not form part of the optical path between the lens and the fibre-optic bundle.

The preferred way of using the method according to the invention to attach a GRIN lens to a fibre-optic imaging bundle in the course of making a low-profile, small diameter fibre-optic endoscope will now be described with reference to FIGS. 5A and 5B. The method can readily be adapted to attach a GRIN lens to a fibre-optic imaging bundle in the course of making other types of fibre-optic based optical instruments.

Figure 5A:
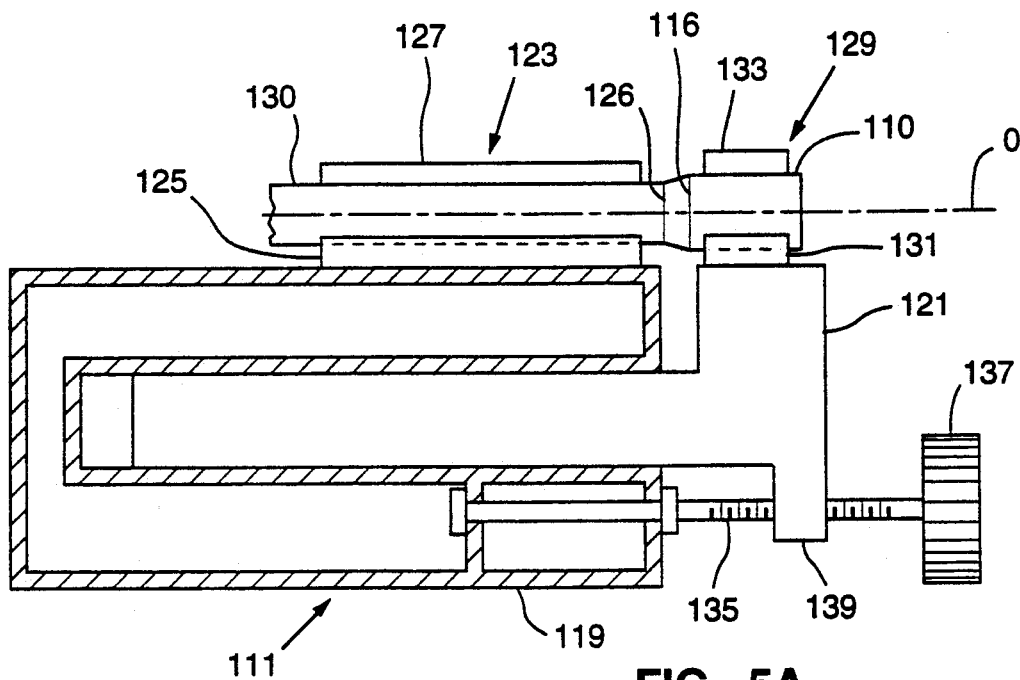
FIG. 5A shows a partially schematic view of the apparatus with which the preferred method according to the invention is carried out.

The method of assembling an optical instrument for use at an extended working distance is preferably practiced using the apparatus shown in FIG. 5A. The assembly jig 111 is mounted on the optical bench 113. The test object 114 is also mounted on the optical bench 113 by means of the adjustable mount 117. The test object is mounted on the adjustable mount 117 so that the test object is centered on the optical axis O defined by the GRIN lens 110 and the fibre-optic bundle 130 mounted in the assembly jig 111.

The adjustable mount 117 can be clamped in a number of positions, such as the position 117A, along the optical bench 113 to enable the apparatus to be used for making instruments optimized for different working distances. The adjustable mount 117 is positioned on the optical bench at the desired working distance from position of the GRIN lens in the assembly jig 111, and is clamped in place. Although the test object 114 is depicted in FIG. 5A by the standard arrow symbol, a grid test pattern or some other test pattern suitable for focus testing is preferably used.

Figure 5B:
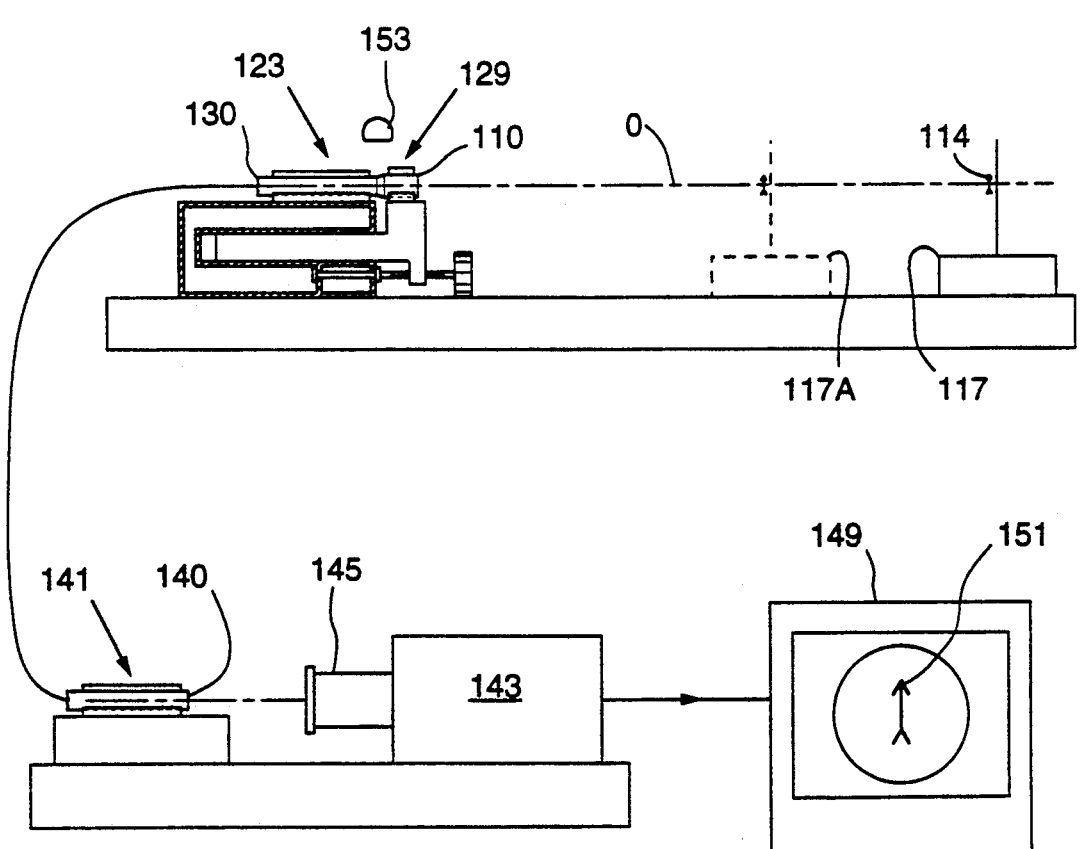
FIG. 5B shows a partially cut-away view of the assembly jig by which the preferred method according to the invention is carried out.

The assembly jig 111 is shown in greater detail in FIG. 5B. The assembly jig accurately locates the less-than-¼-pitch GRIN lens 110 and the fibre-optic bundle 130 relative to the optical axis O and with respect to each other. The assembly jig 111 has two main components, the fixed part 119, and the movable part 121. The fixed part 119 is attached to the optical bench 113. The moving part 121 is mounted in the fixed part 119 such that the moving part 121 can slide relative to the fixed part 119 in the direction of the optical axis O.

The fixed part 119 is fitted with a holding device 123 that temporarily holds the fibre-optic bundle 130 during the assembly process. The holding device 123 is designed such that it accurately and repeatably locates a fibre-optic bundle, such as the fibre-optic bundle 130, mounted therein relative to the optical axis. The holding device 123 prevents any axial movement of the fibre-optic bundle relative to the fixed part. It is desirable that the holding device 123 locate the distal face of each fibre-optic bundle at a repeatable point on the optical axis. The holding device 123 also allows an easy removal of a completed lens/fibre-optic bundle assembly and its replacement by the fibre-optic bundle of the next assembly. As an example of the holding device 123, FIG. 5B depicts the anvil 125 and the clamp 127. The anvil 125 has a longitudinal groove in it to locate the fibre-optic bundle relative to the optical axis. The groove can have a V-shaped or semicircular cross section. The assembly jig may include additional adjustable portions to enable the juxtaposed faces of the GRIN lens and the fibre-optic bundle to be made parallel to and coaxial with one another.

The movable part 121 is fitted with a holding device 129 that temporarily holds the GRIN lens 110 during the assembly process. The holding device 129 is designed such that it accurately and repeatably locates a GRIN lens, such as the lens 110, mounted therein relative to the optical axis. The holding device 129 prevents any axial movement of the lens relative to the moving part. It is desirable that the holding device 129 locate the proximal face of each GRIN lens at a repeatable axial point on the movable part 121. The holding device 129 also allows an easy removal of a completed lens/fibre-optic bundle assembly and its replacement by the GRIN lens of the next assembly. As an example of the holding device 129, FIG. 5B depicts the anvil 131 and the clamp 133. The anvil 133 has a longitudinal groove in it to locate the fibre-optic bundle relative to the optical axis. The groove can have a V-shaped or semicircular cross section.

The moving part 121 is mounted in the fixed part 119 such that it can slide axially relative to the fixed part 119, while keeping the GRIN lens 110 aligned on the optical axis O. The amount of axial movement required to accommodate a full range of working distances is of the order of 0.25 mm (0.01").

The moving part 121 is moved axially by a suitable mechanism. FIG. 5B shows, as an example, a mechanism in which the lead screw 135 is rotatably clamped in the fixed part 119, engages in the threaded bush 139 in the moving part 121, and is controlled by the knob 137. Many other alternatives are possible.

A two-step axial positioning mechanism may be used. In such a mechanism, the lens 110 would be coarsely positioned using a lead screw or similar arrangement, such as the lead screw 135 shown in FIG. 5B. The lens would be finally positioned to achieve optimum focus by axially moving the holding device 129 using a fine positioning device, including, for example, a piezoelectric transducer, an electric bimorph, a solenoid, or a fine-pitch lead screw.

In further alternative configurations of the assembly jig 111, the moving part 121 could be attached to the optical bench 113 using a suitable mount, independently of the fixed part 119. Also, the GRIN lens 110 could be mounted in the fixed part 119, and the fibre-optic bundle 130 could be mounted in the moving part 121. The fixed part could include a mechanism for axially moving the holding device 123.

Returning to FIG. 5A, the holding device 141 holds the proximal end of the fibre-optic bundle 130 such that the fibre-optic bundle is located on the optical axis of the video camera 143. The holding device 141 also locates the proximal face 140 of the fibre-optic bundle at a fixed distance from the lens 145 of the video camera. The video camera 143 and the holding device 141 are mounted on the common support 147. If the assembly jig 111 moves the fibre-optic bundle 130 relative to the lens 110, and the fibre-optic bundle is rigid, the holding device 141 must move so that it tracks the moving part 121 of the assembly jig.

By means of the arrangement shown in FIG. 5A, the image of the object 114 formed by the GRIN lens 110, transmitted through the fibre-optical bundle 130, is focussed by the video camera lens 145 on the sensor (not shown) in the video camera 143. The video signal generated by the video camera 143 in response to the image formed on the sensor is displayed on the monitor 149, which shows the image 151. The displayed image 151 enables the operator to observe not only the focus of the image 151, but also the quality of the image 151. This enables defects that degrade the quality of the image to be detected and remedied. The video camera and monitor can be replaced by a suitable eyepiece, or microscope if desired.

The method for attaching the GRIN lens 110 to the fibre-optic bundle 130 in the course of making an optical instrument suitable for a desired working distance will now be described with reference to FIGS. 5A and 5B. The movable mount 117 is moved along the optical bench so that the test object 114 is at the desired working distance from the lens location in the moving part 121 of the assembly jig 111.

The knob 137 is operated to move the moving part 121 to a starting position relative to the fixed part 119. In the starting position, any lens mounted in the moving part 121 will form an image of the test object 114 in front of the distal face 126 of the fibre-optic bundle. The starting position also provides sufficient space between the distal face of the fibre-optic bundle and the opposing proximal face 116 of the lens to introduce the adhesive between the opposing faces later in the procedure.

A GRIN lens, such as the GRIN lens 110, is mounted in the holding device 129. The distal end of a fibre-optic bundle, such as the fibre-optic bundle 130, is mounted in the holding device 123 and the proximal end of the fibre-optic bundle is mounted in the holding device 141. An out-of-focus image 151 appears on the monitor 149.

A drop of a curable liquid adhesive, such as the ultra-violet curable adhesive Norland Type 81, is introduced between the opposing faces 116 and 126 of the lens and the fibre-optic bundle, respectively. The adhesive is held in place by its surface tension, and fills the space between the opposing faces. This is shown in FIG. 3A. Adding the adhesive, which has a refractive index different from that of air, changes the focus of the image 151.

The knob 137 is then turned to reduce the distance between the lens 110 and the fibre-optic bundle 130. This improves the focus of the image 151. As the knob 137 is adjusted, the quality of the image 151 is observed or electronically monitored. If the image quality is below standard, the adjustment process is suspended, and the defect causing the below-standard image quality is remedied before the adjustment process is resumed.

During the adjustment process, the adhesive remains liquid, which enables the lens 110 to be moved axially relative to the fibre-optic bundle 130. When the image 151 is close to optimal focus, the fine adjustment mechanism, if provided, is used to adjust the position of the lens until the image 151 is optimally focussed. Otherwise this adjustment is made using the normal adjustment mechanism. If the adjustment goes past the optimal focus point, the image 151 disappears, and the distance between the lens and the fibre-optic bundle must be increased until the image reappears and is in focus. Alternatively, the adjustment is made by moving the lens towards the fibre-optic bundle past the optimum focus point until the image disappears. The adjustment is then backed off until the optimally-focussed image reappears.

Figure 5C:
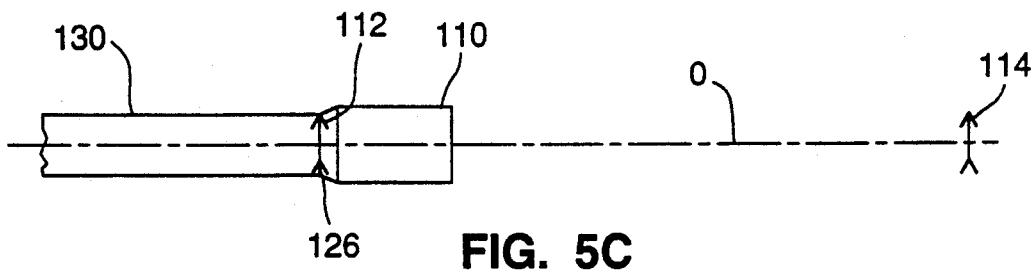
FIG. 5C shows the relative positions of the GRIN lens and the fibre-optic bundle after the step of adjusting the relative position of the lens and the fibre-optic bundle has been performed in the preferred method according to the invention.

Optimal focus is achieved when the distance between the GRIN lens 110 and the fibre-optic bundle 130 is such that the image 112 of the object 114 is formed by the lens 110 exactly on the distal face 126 of the fibre-optic bundle, as shown in FIG. 5C. Once this adjustment has been made, the adhesive can be cured, which is done by switching on the ultra-violet light source 153 for a few tens of seconds. Curing turns the liquid adhesive into a tough, hard, transparent polymer bonded to the proximal face 116 of the lens and the proximal face 126 of the fibre-optic bundle. The adhesive firmly attaches the lens 110 to the distal end of the fibre-optic bundle 130. The image 151 remains optimally focussed after the adhesive is cured because the refractive index of the adhesive changes minimally as a result of curing.

The ultra-violet light source 153 is switched off, the holding devices 123, 129, and 141 are released, and the completed lens/fibre-optic bundle assembly is removed and forwarded for further processing. The assembly jig 111 is then ready to form the next assembly.

The assembly jig 111 can be used to carry out the variation on the assembly method in which a primary axial position adjustment is carried out before the adhesive is introduced into the gap between the juxtaposed faces of the GRIN lens and the fibre-optic bundle. The quality of the image is observed, or is electronically monitored and defects, if any, are remedied before the adhesive is introduced, the final axial position adjustment is carried out, and the adhesive is cured.

Figure 6A:
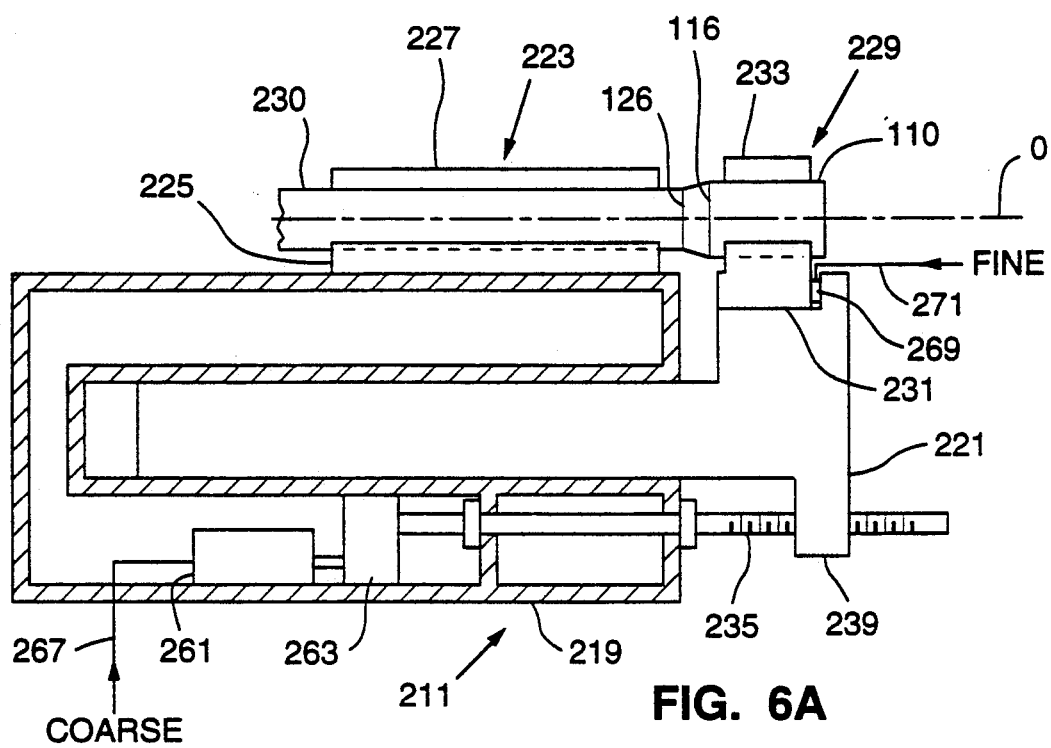
FIG. 6A is a partially cut-away view of an assembly jig with automatic relative positioning adjustment that can be used to practice the method according to the invention.
Figure 6B:
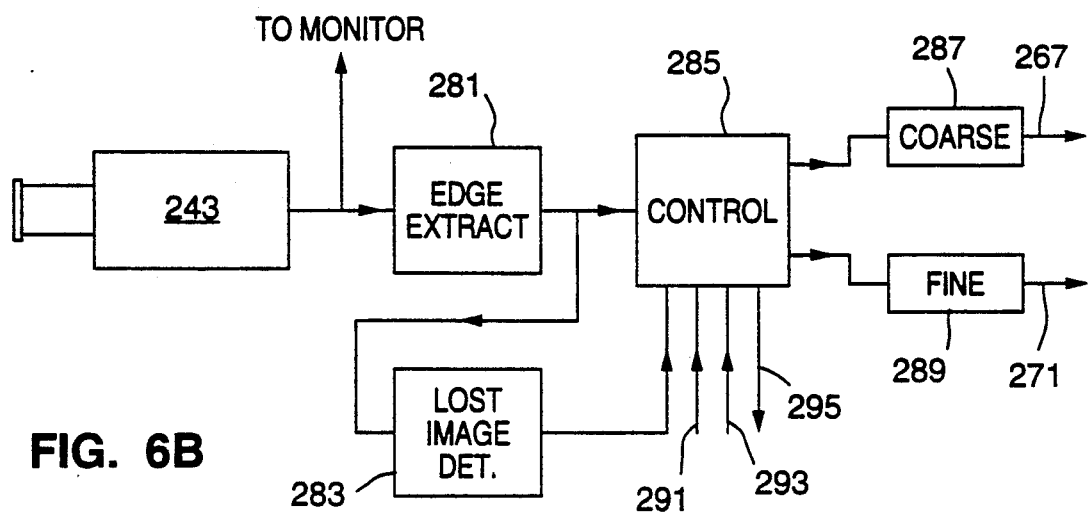
FIG. 6B is a block diagram of the control circuit for the automatic positioning adjustment in the assembly jig shown in FIG. 6A.

The relative positioning of the GRIN lens 110 and the fibre-optic bundle 130 can be adjusted automatically, if desired. A suitable arrangement is shown in FIGS. 6A and 6B. The assembly jig 211 shown in FIG. 6A is based on the assembly jig 111 shown in FIG. 5B. Similar parts use similar reference numbers beginning with "2" instead of "1". The lead screw 235 mounted in the fixed part is driven by the reversible servo motor 261 through the reduction gear box 263. The lead screw 235 engages with the threaded bush 239 attached to the moving part 221. Applying a suitable voltage to the motor 261 moves the moving part to decrease or increase the distance between the lens 110 and the fibre-optic bundle 130.

The anvil 233 is mounted on the moving part 221 such that the anvil can slide axially relative to the moving part 221. The axial position of the anvil 233 relative to the fixed part is set by the transducer 267 positioned between the anvil 233 and the moving part 221. The fine control voltage 271 changes the thickness in the axial direction of the piezoelectric transducer shown as an example of the transducer 267. This changes the axial position of the anvil 233 relative to the moving part 221.

A suitable control system is shown in FIG. 6B. In this, the video signal from the video camera 243 is fed into the edge extractor 281 which extracts from a line in the video signal at least one voltage level transition caused by the image of the object 114 focussed on the sensor in the video camera. Alternatively, and preferably, the voltage level transition may be synthesized from, or adaptively selected from, voltage level transitions in several lines of the video signal, each voltage level transition being caused by a different part of the image.

The voltage level transition is fed from the edge extractor 281 into the control circuit 285, which provides output voltages to the coarse driver 287 and the fine driver 289. The coarse driver 287 and the fine driver 289 produce the coarse control voltage 267 and the fine control voltage 271, respectively. The control circuit 285 produces control voltages such that the rise time of the voltage level transition is minimized. When the rise time is greater than a predetermined threshold, the control circuit provides an output voltage to the coarse driver 287. Once the rise time falls below the threshold, indicating that the focus is close to optimum, the control circuit provides an output voltage to the fine driver 289.

The control circuit 285 also receives the output of the lost image detector 283. The lost image detector monitors the voltage level transition at the output of the edge extractor 281. When the position of the lens 110 moves past the position at which an optimally-focussed image is produced, the image at the proximal end of the fibre-optic bundle disappears, and the rise time of the voltage level transition suddenly increases. The lost image detector detects the sudden increase in the rise time and causes the control circuit to back off the adjustment to restore a focussed image.

The control circuit may be designed to move the lens towards the fibre-optic bundle, past the optimum focus point, until the image at the proximal end of the fibre-optic bundle disappears. The control circuit would then reverse the direction of motion of the lens, and move the lens until the lost image detector determined that the optimally-focussed image had reappeared.

The control circuit 285 additionally receives the inputs 291 and 293, and produces the output 295. The input 291 is fed into the control circuit to initiate the position adjusting process. For example, this input would be after the adhesive has been introduced between the lens and the fibre-optic bundle. The input 293 is fed into the control circuit after the completed lens/fibre-optic bundle assembly has been removed from the assembly jig 211. The input 293 causes the control circuit to restore the assembly jig to its starting position.

The control circuit 285 provides the output 295 to signal that the position adjustment procedure is complete. The output 295 can be used, for example, to switch on the ultra-violet light source 153 to cure the adhesive.

During the process of automatically adjusting the axial position of the moving part 221, and hence of the GRIN lens, the output of the video camera can be displayed on a suitable monitor and the resulting image observed so that the quality of the image can be determined. Alternatively, the video waveform can be monitored to determine the image quality.

Circuitry for providing the functions of the control system using analog and/or digital circuitry, and/or a programmed computer or digital signal processor is known and will not be described here. Sensors and algorithms developed for use in consumer video and still camera auto focus systems could also be adapted for use in the control system described above.

I claim:

1. A method of attaching a GRIN lens to an optical fibre in the course of making an optical instrument for use at a working distance, the method comprising the steps of:

providing a test object;
   providing a GRIN lens and an optical fibre, each having a proximal face and a distal face;
   placing the GRIN lens at the working distance from the test object, and axially aligned therewith;
   placing the optical fibre adjacent to, and axially aligned with, the GRIN lens to form an image of the test object at the proximal face of the optical fibre, the distal face of the optical fibre being placed adjacent to the proximal face of the GRIN lens;
   moving at least one of the GRIN lens and the optical fibre axially with respect to the other until the image of the test object is in focus to determine an optimum axial spacing between the GRIN lens and the optical fibre; and
   attaching the GRIN lens to the optical fibre with the optimum axial spacing between the GRIN lens and the optical fibre.

2. The method of claim 1, wherein, in the step of providing the GRIN lens, a GRIN lens having a nominal pitch in the range of 0.2 to 0.27 is provided.

3. The method of claim 2, wherein:
   the method is for making an optical instrument for use at an extended working distance; and
   in the step of providing the GRIN lens, a GRIN lens having a nominal pitch of less than or equal to 0.24 is provided.

4. The method of claim 1, wherein:
   the method additionally includes the step of providing:
      an electronic image sensor sensing the image at the proximal face of the optical fibre, and
      a transducer connected to the GRIN lens and the optical fibre; and
   in the step of moving at least one of the GRIN lens and the optical fibre axially with respect to the other, the transducer moves one of the GRIN lens and the optical fibre axially with respect to the other in response to the electronic image sensor until the image of the test object is in focus.

5. The method of claim 1, wherein:
   the method additionally comprises the step of providing a jig having a first holding device and a second holding device, the first holding device being axially aligned with the second holding device, and at least one of the holding devices being axially movable with respect to the other;
   the step of placing the GRIN lens at the working distance from the test object includes the step of mounting the GRIN lens in the first holding device;
   the step of placing the optical fibre adjacent to the GRIN lens includes mounting the GRIN lens in the second holding device; and in the step of moving at least one of the GRIN lens and the optical fibre axially with respect to the other, at least one of the holding devices is moved axially with respect to the other.

6. The method of claim 1, wherein the step of moving at least one of the GRIN lens and the optical fibre axially with respect to the other until the image of the test object is in focus includes the steps of:
   moving at least one of the GRIN lens and the optical fibre axially towards the other until the image of the test object disappears; and
   moving at least one of the GRIN lens and the optical fibre axially away from the other until the image of the test object re-appears in focus, the GRIN lens and the optical fibre being optimally spaced when the image of the test object re-appears in focus.

7. The method of claim 1, wherein the step of moving at least one of the GRIN lens and the optical fibre axially with respect to the other includes the steps of:
   observing the image of the test object, and determining whether the image of the test object has a quality meeting a predetermined quality standard; and
   when the quality of the image falls below the predetermined quality standard, remedying a defect to improve the quality of the image to meet the predetermined quality standard.

8. The method of claim 1, wherein the step of moving at least one of the GRIN lens and the optical fibre axially with respect to the other includes the step of observing the image of the test object with an optical instrument selected from a group including an electronic image sensor and display screen, an eyepiece, and a microscope.

9. A method for attaching a GRIN lens to an optical fibre in the course of making an optical instrument for use at a working distance, the method comprising the steps of:
   providing a test object;
   providing a GRIN lens having a proximal face, an optical fibre having a proximal face and a distal face, and a curable liquid adhesive;
   placing the GRIN lens at the working distance from test object, and axially aligned therewith;
   placing the optical fibre adjacent to, and axially aligned with, the GRIN lens to form an image of the test object at the proximal face of the optical fibre, the distal face of the optical fibre being placed adjacent to the proximal face of the GRIN lens;
   introducing the curable liquid adhesive between the proximal face of the GRIN lens and the distal face of the optical fibre;
   moving at least one of the GRIN lens and the optical fibre axially with respect to the other until the image of the test object is in focus; and
   curing the curable liquid adhesive.

10. The method of claim 9, wherein, in the step of providing the GRIN lens, a GRIN lens having a pitch in the range of 0.2 to 0.27 is provided.

11. The method of claim 9, wherein, in the step of providing the curable liquid adhesive, a liquid adhesive curable using ultraviolet light is provided.

12. The method of claim 9, wherein, in the step of providing the optical fibre, the optical fibre is included in a fibre-optic image bundle.

13. The method of claim 9, wherein:
    in the step of providing a GRIN lens, a GRIN lens having a lens diameter is provided; and
    in the step of placing the GRIN lens at the working distance from the test object, the GRIN lens is placed at a distance of at least fifty times the lens diameter from the test object.

14. The method of claim 13, wherein in the step of providing the GRIN lens, a GRIN lens having a pitch of less than or equal to 0.24 is provided.

15. The method of claim 9, wherein:
    the step of moving at least one of the GRIN lens and the optical fibre axially with respect to the other until the image of the test object is in focus includes the steps of:
    moving at least one of the GRIN lens and the optical fibre axially towards the other until the image of the test object disappears; and
    moving at least one of the GRIN lens and the optical fibre axially away from the other until the image of the test object reappears in focus.

16. The method of claim 9, wherein the step of moving at least one of the GRIN lens and the optical fibre axially with respect to the other includes the steps of:
    observing the image of the test object, and determining whether the image of the test object has a quality meeting a predetermined quality standard; and
    when the quality of the image falls below the predetermined quality standard, remedying a defect to improve the quality of the image to meet the predetermined quality standard.

17. The method of claim 9, wherein the step of moving at least one of the GRIN lens and the optical fibre axially with respect to the other includes the step of observing the image of the test object with an optical instrument selected from a group including an electronic image sensor and display screen, an eyepiece, and a microscope.

18. The method of claim 9, wherein:
    the method additionally includes the step of providing:
    an electronic image sensor sensing the image at the proximal face of the optical fibre, and
    a transducer connected to the GRIN lens and the optical fibre; and
    in the step of moving at least one of the GRIN lens and the optical fibre axially with respect to the other, the transducer moves one of the GRIN lens and the optical fibre axially with respect to the other in response to the electronic image sensor until the image of the test object is in focus.

19. The method of claim 9, wherein:
    the method additionally comprises the steps of providing a jig having a first holding device and a second holding device, the first holding device being axially aligned with the second holding device, and at least one of the holding devices being axially movable with respect to the other;
    the step of placing the GRIN lens at the working distance from the test object includes the step of mounting the GRIN lens in the first holding device;
    the step of placing the optical fibre adjacent to the GRIN lens includes mounting the GRIN lens in the second holding device; and
    in the step of moving at least one of the GRIN lens and the optical fibre axially with respect to the other, at least one of the holding devices is moved axially with respect to the other.

20. The method of claim 19, wherein, in the step of providing the GRIN lens, a GRIN lens having a pitch in the range of 0.2 to 0.27 is provided.

21. The method of claim 20, wherein:
the method is for making an optical instrument for use at an extended working distance; and
in the step of providing the GRIN lens, a GRIN lens having a pitch of less than or equal to 0.24 is provided.

22. The method of claim 19, wherein in the step of providing the curable liquid adhesive, a liquid adhesive curable using ultraviolet light is provided.

23. The method of claim 19, wherein:
the method additionally includes the step of providing:
an electronic image sensor sensing the image at the proximal face of the optical fibre, and
a transducer connected to the first holding device and the second holding device; and
in the step of moving at least one of the GRIN lens and the optical fibre axially with respect to the other, the transducer moves at least one of the first holding device and the second holding device axially with respect to the other in response to the electronic image sensor until the image of the test object is in focus.

24. The method of claim 9, wherein:
the step of introducing the curable liquid adhesive is performed after the step of moving at least one of the GRIN lens and the optical fibre axially with respect to the other; and
after the step of introducing the curable liquid adhesive, the method additionally comprises the step of again moving at least one of the GRIN lens and the optical fibre axially with respect to the other until the image of the test object is once more in focus.

25. The method of claim 24, wherein the step of moving at least one of the GRIN lens and the optical fibre axially with respect to the other performed before the step of introducing the curable liquid adhesive includes the steps of:
determining whether the image of the test object has a quality meeting a predetermined quality standard, and
when the quality of the image falls below the predetermined quality standard, remedying a defect to improve the quality of the image to meet the predetermined quality standard.

26. The method of claim 24, wherein, in the step of providing the GRIN lens, a GRIN lens having a pitch in the range of 0.2 to 0.27 is provided.

27. The method of claim 26, wherein:
the method is for making an optical instrument for use at an extended working distance; and
in the step of providing the GRIN lens, a GRIN lens having a pitch of less than or equal to 0.24 is provided.

28. The method of claim 24, wherein:
the method additionally includes the step of providing:
an electronic image sensor sensing the image at the proximal face of the optical fibre, and
a transducer connected to the GRIN lens and the optical fibre;
in the step of moving at least one of the GRIN lens and the optical fibre axially with respect to the other, the transducer moves one of the GRIN lens and the optical fibre axially with respect to the other in response to the electronic image sensor until the image of the test object is in focus; and
in the step of again moving at least one of the GRIN lens and the optical fibre axially with respect to the other, the transducer moves one of the GRIN lens and the optical fibre axially with respect to the other in response to the electronic image sensor until the image of the test object is once more in focus.

29. The method of claim 24, wherein:
the method additionally comprises the step of providing a jig having a first holding device and a second holding device, the first holding device being axially aligned with the second holding device, and at least one of the holding devices being axially movable with respect to the other;
the step of placing the GRIN lens at the working distance from the test object includes the step of mounting the GRIN lens in the first holding device;
the step of placing the optical fibre adjacent to the GRIN lens includes mounting the GRIN lens in the second holding device;
in the step of moving at least one of the GRIN lens and the optical fibre axially with respect to the other, at least one of the holding devices is moved axially with respect to the other; and
in the step of again moving at least one of the GRIN lens and the optical fibre axially with respect to the other, at least one of the holding devices is moved axially with respect to the other.

30. The method of claim 24, wherein:
the step of moving at least one of the GRIN lens and the optical fibre axially with respect to the other until the image of the test object is in focus and the step of again moving at least one of the GRIN lens and the optical fibre axially with respect to the other until the image of the test object is once more in focus each includes the steps of:
moving at least one of the GRIN lens and the optical fibre axially towards the other until the image of the test object disappears; and
moving at least one of the GRIN lens and the optical fibre axially away from the other until the image of the test object reappears in focus.

31. An optical instrument for use at a working distance, the optical instrument including a GRIN lens and an optical fibre, and being made by a method comprising the steps of:
providing a test object;
providing a GRIN lens and an optical fibre, each having a proximal face and a distal face;
placing the GRIN lens at the working distance from the test object, and axially aligned therewith;
placing the optical fibre adjacent to, and axially aligned with, the GRIN lens to form an image of the test object at the proximal face of the optical fibre, the distal face of the optical fibre being placed adjacent to the proximal face of the GRIN lens;
moving at least one of the GRIN lens and the optical fibre axially with respect to the other until the image of the test object is in focus to determine an optimum axial spacing between the GRIN lens and the optical fibre; and
attaching the GRIN lens to the optical fibre with the optimum axial spacing between the GRIN lens and the optical fibre.

32. The optical instrument of claim 31, wherein, in the step in the method of providing the GRIN lens, a GRIN lens having a pitch in the range of 0.2 to 0.27 is provided.

33. The optical instrument of claim 32, wherein:
the optical instrument for use at an extended working distance; and
in the step in the method of providing the GRIN lens, a GRIN lens having a pitch of less than or equal to 0.24 is provided.

34. The optical instrument of claim 31, wherein, in the method:
the method additionally includes the step of providing:
an electronic image sensor sensing the image at the proximal face of the optical fibre, and
a transducer connected to the GRIN lens and the optical fibre; and
in the step of moving at least one of the GRIN lens and the optical fibre axially with respect to the other, the transducer moves at least one of the GRIN lens and the optical fibre axially with respect to the other in response to the electronic image sensor until the image of the test object is in focus.

35. The optical instrument of claim 31, wherein, in the method:
the method additionally comprises the steps of providing a jig having a first holding device and a second holding device, the first holding device being axially aligned with the second holding device, and at least one of the holding devices being axially movable with respect to the other;
the step of placing the GRIN lens at the working distance from the test object includes the step of mounting the GRIN lens in the first holding device;
the step of placing the optical fibre adjacent to the GRIN lens includes mounting the GRIN lens in the second holding device; and
in the step of moving at least one of the GRIN lens and the optical fibre axially with respect to the other, at least one of the holding devices is moved axially with respect to the other.

36. The instrument of claim 31, wherein, in the method, the step of method of moving at least one of the GRIN lens and the optical fibre axially with respect to the other includes the steps of:
observing the image of the test object, and determining whether the image of the test object has a quality meeting a predetermined quality standard; and
when the quality of the image falls below the predetermined quality standard, remedying a defect to improve the quality of the image to meet the predetermined quality standard.

37. The instrument of claim 31, wherein, in the method, the step of moving at least one of the GRIN lens and the optical fibre axially with respect to the other includes the step of observing the image of the test object with an optical instrument selected from a group including an electronic image sensor and display screen, an eyepiece, and a microscope.

38. An optical instrument of claim 31, wherein the method of making the optical instrument additionally comprises the steps of:
providing a curable liquid adhesive;
introducing the curable liquid adhesive between the proximal face of the GRIN lens and the distal face of the optical fibre after the step of placing the optical fibre adjacent to the GRIN lens; and
curing the curable liquid adhesive after the step of moving at least one of the GRIN lens and the optical fibre axially with respect to the other.

39. The optical instrument of claim 38, wherein, in the step in the method of providing the GRIN lens, a GRIN lens having a pitch in the range of 0.2 to 0.27 is provided.

40. The optical instrument of claim 38, wherein, in the step in the method of providing the curable liquid adhesive, a liquid adhesive curable using ultraviolet light is provided.

41. The optical instrument of claim 38, wherein, in the step in the method of providing the optical fibre, the optical fibre is included in a fibre-optic image bundle.

42. The optical instrument of claim 38, wherein:
in the step in the method of providing a GRIN lens, a GRIN lens having a lens diameter is provided; and
in the step in the method of placing the GRIN lens at the working distance from the test object, the GRIN lens is placed at a distance of at least fifty times the lens diameter from the test object.

43. The optical instrument of claim 42, wherein in the step in the method of providing the GRIN lens, a GRIN lens having a pitch of less than or equal to 0.24 is provided.

44. The optical instrument of claim 38, wherein, in the method, the step of moving at least one of the GRIN lens and the optical fibre axially with respect to the other includes the steps of:
observing the image of the test object, and determining whether the image of the test object has a quality meeting a predetermined quality standard; and
when the quality of the image falls below the predetermined quality standard, remedying a defect to improve the quality of the image to meet the predetermined quality standard.

45. The instrument of claim 38, wherein, in the method, the step of moving at least one of the GRIN lens and the optical fibre axially with respect to the other includes the step of observing the image of the test object with an optical instrument selected from a group including an electronic image sensor and display screen, an eyepiece, and a microscope.

46. The optical instrument of claim 38, wherein the step of moving at least one of the GRIN lens and the optical fibre axially with respect to the other until the image of the test object is in focus includes the steps of:
moving at least one of the GRIN lens and the optical fibre axially towards the other until the image of the test object disappears; and
moving at least one of the GRIN lens and the optical fibre axially away from the other until the image of the test object reappears in focus.

47. The optical instrument of claim 38, wherein:
the method of making the optical instrument additionally includes the step of providing:
an electronic image sensor sensing the image at the proximal face of the optical fibre, and
a transducer connected to the GRIN lens and the optical fibre; and
in the step in the method of moving at least one of the GRIN lens and the optical fibre axially with respect to the other, the transducer moves at least one of the GRIN lens and the optical fibre axially with respect to the other in response to the electronic image sensor until the image of the test object is in focus.

48. The optical instrument of claim 38, wherein:
the method of making the optical instrument additionally comprises the step of providing a jig having a first holding device and a second holding device, the first holding device being axially aligned with the second holding device, and at least one of the holding devices being axially movable with respect to the other;
the step in the method of placing the GRIN lens at the working distance from the test object includes the step of mounting the GRIN lens in the first holding device;
the step in the method of placing the optical fibre adjacent to the GRIN lens includes mounting the GRIN lens in the second holding device; and
in the step in the method of moving at least one of the GRIN lens and the optical fibre axially with respect to the other, at least one of the holding devices is moved axially with respect to the other.

49. The optical instrument of claim 48, wherein, in the step in the method of providing the GRIN lens, a GRIN lens having a pitch in the range of 0.2 to 0.27 is provided.

50. The optical instrument of claim 49, wherein:
the optical instrument for use at an extended working distance; and
in the step in the method of providing the GRIN lens, a GRIN lens having a pitch of less than or equal to 0.24 is provided.

51. The optical instrument of claim 48, wherein, in the step in the method of providing the curable liquid adhesive, a liquid adhesive curable using ultraviolet light is provided.

52. The optical instrument of claim 48, wherein:
the method of making the optical instrument additionally includes the step of providing:
an electronic image sensor sensing the image at the proximal face of the optical fibre, and
a transducer connected to the first holding device and the second holding device; and
in the step in the method of moving at least one of the GRIN lens and the optical fibre axially with respect to the other the transducer moves at least one of the first holding device and the second holding device axially with respect to the other in response to the electronic image sensor until the image of the test object is in focus.

53. The optical instrument of claim 38, wherein:
the step in the method of introducing the curable liquid adhesive is performed after the step of moving at least one of the GRIN lens and the optical fibre axially with respect to the other; and
after the step of introducing the curable liquid adhesive, the method additionally comprises the step of again moving at least one of the GRIN lens and the optical fibre axially with respect to the other until the image of the test object is once more in focus.

54. The optical instrument of claim 53, wherein the step in the method of moving at least one of the GRIN lens and the optical fibre axially with respect to the other performed before the step of introducing the curable liquid adhesive includes the steps of:
determining whether the image of the test object has a quality meeting a predetermined quality standard, and
when the quality of the image falls below the predetermined quality standard, remedying a defect to improve the quality of the image to meet the predetermined quality standard.

* * * * *